April 14, 1959 M. E. EBERT 2,881,667
UNIVERSAL VISE
Filed May 7, 1958 2 Sheets-Sheet 1

INVENTOR.
MAX E. EBERT
BY
*Philip G. Hilbert*
ATTORNEY

April 14, 1959     M. E. EBERT     2,881,667
UNIVERSAL VISE
Filed May 7, 1958                                2 Sheets-Sheet 2
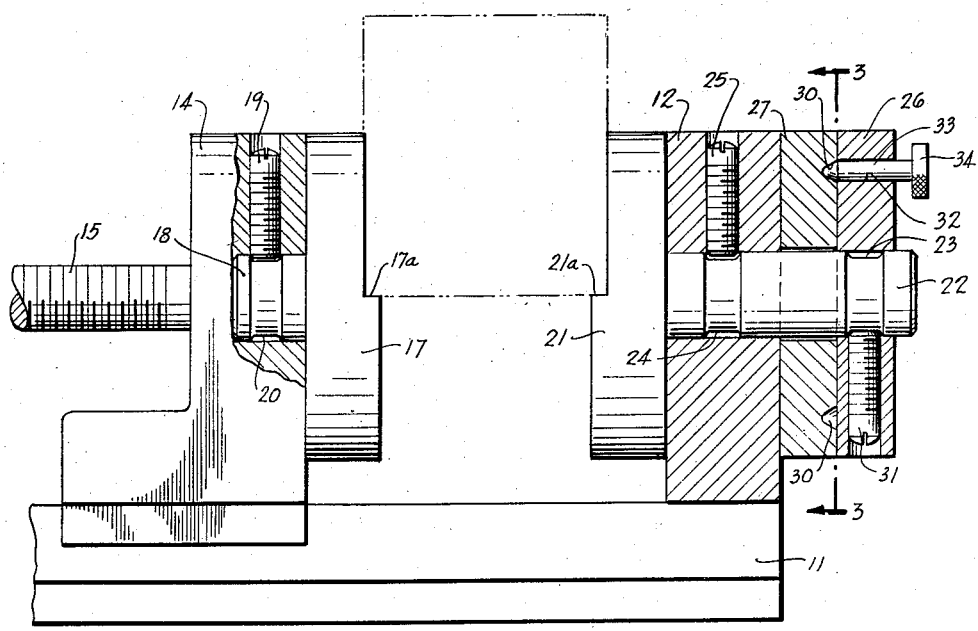
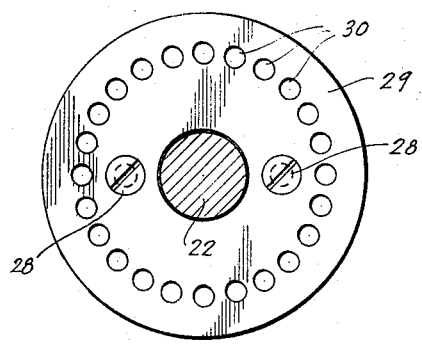
INVENTOR.
MAX E. EBERT
BY
*Philip G. Hilbert*
ATTORNEY

United States Patent Office 2,881,667
Patented Apr. 14, 1959

2,881,667

UNIVERSAL VISE

Max E. Ebert, Ridgefield, N.J.

Application May 7, 1958, Serial No. 733,675

5 Claims. (Cl. 90—59)

This invention relates to a machinist's or tool maker's vise, and more particularly concerns a vise for holding work pieces at various selected angular positions.

In general machine shop practice it is frequently required that small work pieces be machined at various angles and it is then necessary to make time consuming arrangements for utilizing the conventional square jaw vise, for the purpose. Although there are vises available which are adjustable to any desired angle, in both single and compouund types, such known vises are impractical because of their excessive height and weight, as well as general bulkiness.

Furthermore, known vise constructions do not lend themselves to portability, which is important when the work piece must be subjected to successive machining operations without disturbing the position of the work piece. Also, the accuracy of the angular settings in such known devices is independent on the ability of the operator in properly aligning the usual calibrated graduations on the relatively movable portions of the device.

Accordingly, an object of this invention is to provide an improved universal device which is compact, readily portable and including improved indexing means for precisely and quickly setting the work piece at any desired angular position thereof, said positions varying by as little as 1°.

Another object of this invention is to provide a vise of the character described which is made up of a minimum number of parts, which is economical to manufacture and easily manipulated for use in connection with a variety of machining and tool making operations.

Other objects of this invention will in part be obvious and in part hereinafter pointed out.

In the drawing,

Fig. 2 is an elevational view thereof with parts broken away, and parts in section; and Fig. 3 is a sectional view taken on the line 3—3 of Fig. 2.

Figure 1:
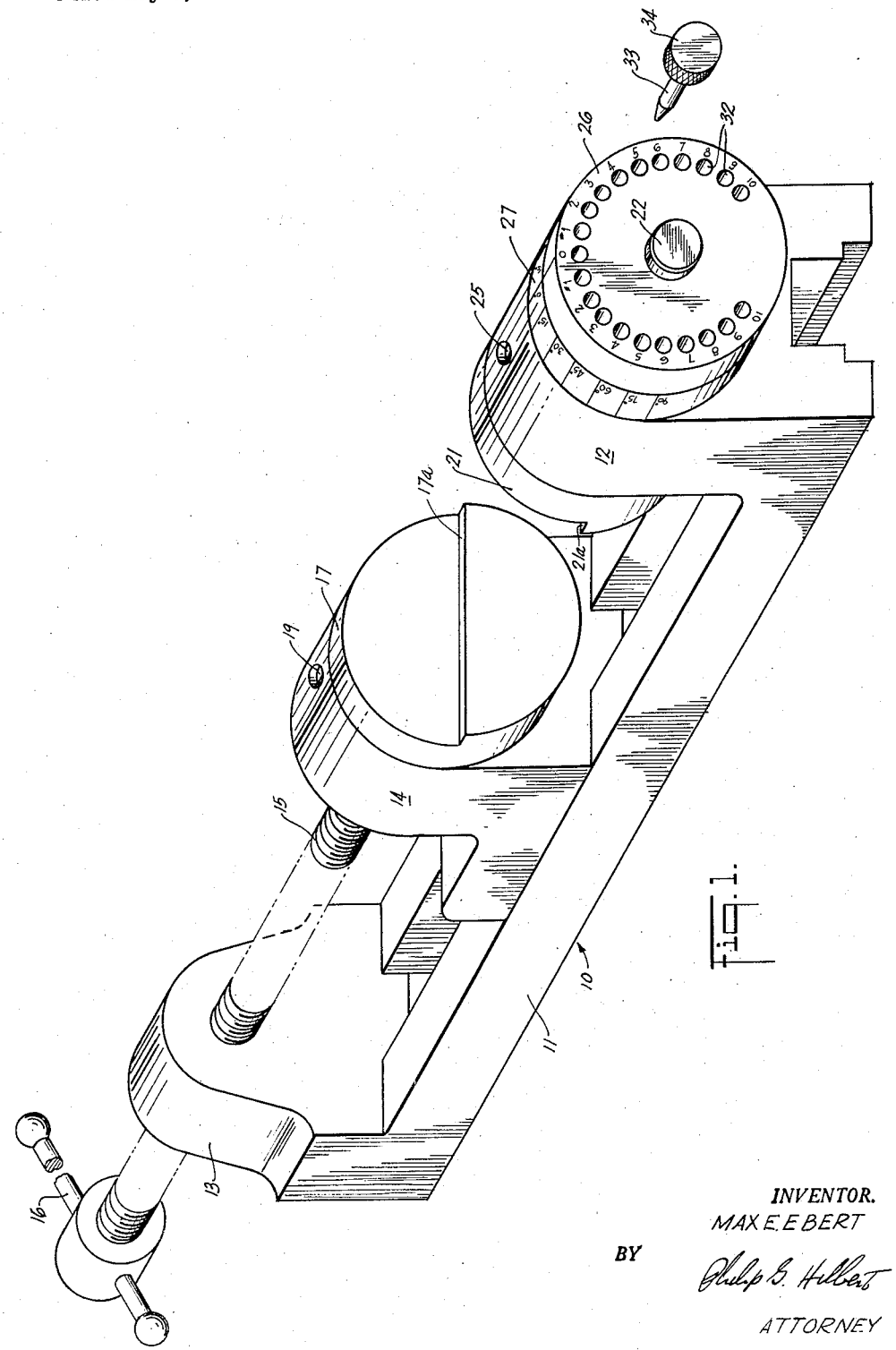
Fig. 1 is an isometric view of a universal vise embodying the invention.

Referring in detail to the drawing, 10 designates a universal vise embodying the invention. The same comprises an elongated base 11 having an integral, upstanding jaw support 12 at one end thereof and an integral, upstanding screw seat 13 at the other end thereof. A longitudinally movable jaw support 14 is mounted on base 11 for movement toward and away from support 12, by means of longitudinally disposed screw 15 which is engaged at its inner end with support 14, is in threaded engagement with screw seat 13 and has the usual cross handle 16 on the outer end thereof.

A jaw member 17 in the form of a substantially flat plate, is provided with a stepped shoulder 17a on one face thereof, for engaging one side of a work piece, not shown. A short shank 18 extends axially from the other face of member 17, said shank being received in a suitable axially disposed recess formed in jaw support 14. A radially located screw 19 on jaw support 14 has its outer end received in an annular groove 20 on shank 18, thereby allowing jaw member 17 to freely rotate on support 14 while preventing relative axial movement therebetween.

A second jaw member 21, somewhat similar to jaw member 17, has a stepped shoulder 21a on its outer face for engagement with the opposite side of said work piece; and a long shank 22 extending axially from the other face thereof. Said shank 22 is received in an axial bore in jaw support 12 and projects outwardly thereof. Shank 22 is formed with axially spaced annular grooves 23, 24; the groove 24 receiving the outer end of a radial screw 25 on jaw support 12, allowing rotation of jaw member 21 while preventing longitudinal movement thereof relative to jaw support 12.

It will be apparent that a work piece may be positioned between jaw members 17, 21 and held on shoulders 17a, 21a thereof, thereby automatically bringing the rotatable jaw members into correlated angular positions, just before handle 16 is turned to tightly grip said work piece.

Means is provided for indexing the rotation of jaw members 17, 21 so as to set the interposed workpiece at any desired angular position, in selected small angular increments of the order of 1°.

To this end, a pair of circular indexing dials 26, 27 are located in coaxial juxtaposition on the outwardly projecting portion of shank 22 of jaw member 21. Inner dial 27 is fixedly secured to the outer face of jaw support 12 by screws 28, said dial having a central bore which freely passes the rotatable shank 22. Dial 27 is formed on its outer face 29 with a circular arrangement of tapered recesses 30, said recesses having a predetermined, uniform angular spacing therebetween. Thus, for the purpose of illustration, dial 27 may be formed with twenty-four such recesses at 15° intervals.

Outer dial 26 is fixed to shank 22 for movement therewith by a radial set screw 31, the outer end of which is engaged in shank groove 23, thus making dial 26 rotatable with jaw member 21. Dial 26 is formed with a circular row of through openings 32 located at a predetermined, uniform angular spacing which is different from the spacing between recesses 30. Thus, there may be twenty-one openings 32 at 14° intervals. Openings 32 and recesses 30 are disposed in circles of the same radius so that any selected opening 32 may register with selected recesses 30 upon suitable rotation of dial 26.

A pin 33 having a head 34 at one end and tapered at the other end, is provided for slidable insertion in openings 32 in dial 26, the position of said pin being adjustable to engage or disengage a selected recess 30 on dial 27.

The fixed dial 27 is marked on its periphery with transverse graduations respectively aligned with recesses 30 on said dial, to show the 0°, 15°, 30°, etc. intervals. The rotatable dial 26 may have its openings 32 marked off for convenience on either side of a 0 position opening, as indicated in Fig. 1.

The vise 10 may be used to position a work piece, not shown, held between jaws 17, 21, in any selected angular position. It is understood that the shoulder 21a on jaw 21 is held at a true, horizontal level when the 0 position of dial 26 is aligned with the 0° position of dial 27; set screw 31 being used to calibrate the position of dial 26 in respect to said jaw shoulder 21a.

The jaws 17, 21 may be rotated in either direction to a selected angular position, placing the workpiece clamped therebetween in the desired position. Assuming that the workpiece is to be located in the 15° position in a clockwise direction, looking at Fig. 1, then with the workpiece lightly clamped between the jaws while permitting rotation of the jaws, the pin 33 is positioned in the 0 opening on dial 26 while said dial is rotated in a clockwise direction until the tapered end of the pin slips into and is snugly received in the recess 30 on dial 27, thus indexing the workpiece accurately and without reliance on observed registry of graduations, to the desired angular position. The handle 16 is then turned in the proper direction to securely hold the workpiece and jaws in said position.

For positions which are multiples of 15°, the operation described above is repeated except that the dial 26 is continued in its clockwise rotation to the desired 30°, 45°, etc.

If the worpiece is to be located at positions intermediate successive 15° intervals; say at 16°, then the procedure may be as follows. The jaws 17, 21 and the workpiece therebetween are rotated to the 15° position as described above. The dial 26 is held in its indexed position, by hand, while pin 33 is removed from the 0 opening and reinserted in the opening 32 designated as #1 to the right of the 0 opening, looking at Fig. 1.

The dial 26 is now continued in its clockwise rotation until pin 33 reseats itself in the next adjacent recess 30 in dial 27, which would be at the 30° interval. The workpiece will now have been advanced at a total of 16° and the jaws 17, 21 can be fully clamped in the selected position.

For locating the workpiece in the 36° position, the procedure previously described, is followed except that the dial 26 is initially brought to the 30° position, held in place by hand while pin 33 is reinserted in the opening 32 designated as #6 to the right of the 0 opening, looking at Fig. 1. The dial 26 is then continued in its clockwise rotation until pin 33 reseats itself in the next adjacent recess 30 on dial 27; thus advancing the workpiece to its desired angular position.

The 36° position may also be located by initially rotating dial 26 to the 45° position, reinserting pin 33 in the opening designated as #9 and then rotating the dial 26 in a counterclockwise direction until said pin reseats itself in the next adjacent recess 30 in dial 27.

While the jaws 17, 21 are shown as being of circular outline, it is understood that they may have peripheral outlines of other configurations. Also, the shoulders 17a, 21a may be varied to suit particular forms of workpieces, as desired.

While dials 26, 27 have their openings 32 and recesses 30 at certain specified angular spacings, it is understood that such spacings may be varied while maintaining a differential spacing as between the openings and the recesses.

The vise 10 may be mounted on any suitable subbase and may be held in a tilt type base. Also, vise 10 may be used to hold a conventional vise in its jaws to allow for machining operations on a workpiece in oppositely disposed planes.

As various changes might be made in the embodiment of the invention herein shown without departing from the spirit thereof, all matter described herein shall be deemed illustrative and not by way of limitation except as set forth in the appended claims.

Having thus disclosed my invention, I claim as new and desire to protect by Letters Patent:

1. A vise having a base, a pair of jaw supports on said base and arranged for relative movement towards and away from each other, a jaw rotatably mounted on each support, and means for indexing the rotary movement of one of said jaws on its associated support, said means comprising a pair of indexing dials coaxially related to the axis of said one jaw, one of said dials being fixed and formed on one face thereof with a plurality of recesses arranged in a circle at a predetermined, uniform angular spacing therebetween, the other of said dials being rotatable with said one jaw and formed with a plurality of openings arranged in a circle and registrable with the recesses in said one dial, said openings having a predetermined, uniform angular spacing therebetween different from the spacing between said recesses, and means insertable in selected openings in said rotatable dial and engageable in selected recesses on said fixed dial for rotating said one rotatable jaw through selected increments of rotary movement.

2. A vise as in claim 1 wherein the opposed faces of said jaws are formed with work holding means whereby the interposition of a work piece into engaging relation with the work holding means on said jaws will cause conjoint rotary movement of said jaws and work piece upon indexed rotation of said one jaw.

3. A vise having a base, a jaw support fixed on said base, a jaw support movably mounted on said base for movement toward and away from said fixed jaw support, a pair of opposed jaws rotatably mounted on the respective jaw supports, a circular indexing dial fixed on said fixed jaw support and coaxially related with the jaw associated therewith, a circular indexing dial coaxially and fixedly related to the jaw associated with said fixed jaw support for conjoint rotary movement therewith, said fixed dial being formed with recesses on one face thereof arranged in a circle, said rotary dial being formed with through openings arranged in a circle and registrable with said recesses, the angular spacing between said recesses being different from the angular spacing between said openings, and pin means slidably receivable in selected openings of the rotatable dial for reception in selected recesses on the fixed dial for rotating the jaw associated with said fixed jaw support through selected increments of rotary movement.

4. A vise as in claim 3 wherein said jaw supports are formed with aligned openings and each jaw includes an axial shank received in the opening of the associated support, said rotary dial being fixedly mounted on the shank of the jaw associated with said fixed support, said fixed dial being formed with a central opening for passing said last mentioned jaw shank, said fixed dial being located between said rotary dial and the outer face of said fixed jaw support.

5. A vise as in claim 4 wherein said last mentioned jaw shank is formed with an annular groove, and means on said fixed jaw support extending radially thereof for engagement in the groove of said jaw shank to fix said rotatable jaw against rotary movement.

References Cited in the file of this patent
UNITED STATES PATENTS
2,491,559    Hargrett _____ Dec. 20, 1949